(12) United States Patent
Vikberg et al.

(10) Patent No.: US 11,012,577 B2
(45) Date of Patent: May 18, 2021

(54) METHOD FOR ENABLING DIFFERENTIATED CHARGING SUPPORT

(71) Applicant: Telefonaktiebolaget LM Ericsson (publ), Stockholm (SE)

(72) Inventors: Jari Vikberg, Järna (SE); Fredric Kronestedt, Bromma (SE); Magnus Lundevall, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 41 days.

(21) Appl. No.: 16/098,944

(22) PCT Filed: May 18, 2016

(86) PCT No.: PCT/SE2016/050450
§ 371 (c)(1),
(2) Date: Nov. 5, 2018

(87) PCT Pub. No.: WO2017/200437
PCT Pub. Date: Nov. 23, 2017

(65) Prior Publication Data
US 2019/0199860 A1 Jun. 27, 2019

(51) Int. Cl.
*H04M 15/00* (2006.01)
*H04W 4/24* (2018.01)
(Continued)

(52) U.S. Cl.
CPC ........ *H04M 15/8033* (2013.01); *H04L 12/14* (2013.01); *H04M 15/8038* (2013.01);
(Continued)

(58) Field of Classification Search
CPC ......... H04M 15/8033; H04M 15/8038; H04M 15/81; H04W 4/50; H04W 36/00837;
(Continued)

(56) References Cited

U.S. PATENT DOCUMENTS

2010/0062768 A1* 3/2010 Lindqvist ............. H04W 4/029
455/435.1
2012/0064904 A1* 3/2012 Lee ..................... H04W 72/082
455/450
(Continued)

FOREIGN PATENT DOCUMENTS

CN 101 547 425 A 9/2009
CN 103 596 127 A 2/2014
(Continued)

OTHER PUBLICATIONS

International Search Report and Written Opinion of the International Searching Authority for International Application No. PCT/SE2016/050450 dated Feb. 13, 2017.

*Primary Examiner* — Mehmood B. Khan
(74) *Attorney, Agent, or Firm* — Sage Patent Group (57) ABSTRACT

The present disclosure relates a method performed in a first Radio network node, serving a first service area, of notifying a Core Network node, CN, of a change of service area for a User Equipment, UE. The method comprises detecting that the UE has changed location between the first service area and a second service area served by at least a second Radio network node, wherein the first and second service areas are being associated with a respective service charge, and providing a notification to the Core Network Node informing about the change of service area for the UE, the indication enabling a CN function to change the service charge for the UE.

28 Claims, 7 Drawing Sheets

(51) Int. Cl.
*H04W 4/50* (2018.01)
*H04L 12/14* (2006.01)

(52) U.S. Cl.
CPC ........... *H04M 15/81* (2013.01); *H04M 15/83* (2013.01); *H04M 15/8353* (2013.01); *H04M 15/851* (2013.01); *H04W 4/24* (2013.01); *H04W 4/50* (2018.02)

(58) Field of Classification Search
CPC ..... H04W 36/04; H04W 36/32; H04W 36/38; H04L 12/14
See application file for complete search history.

(56) References Cited

U.S. PATENT DOCUMENTS

| | | | |
|---|---|---|---|
| 2012/0195255 A1 | 8/2012 | Nylander et al. | |
| 2013/0017855 A1* | 1/2013 | Hui | H04W 16/28 455/522 |
| 2013/0155847 A1* | 6/2013 | Li | H04W 76/10 370/225 |
| 2013/0194950 A1* | 8/2013 | Haghighat | H04L 5/0073 370/252 |
| 2013/0337822 A1 | 12/2013 | Rubin et al. | |
| 2014/0073331 A1* | 3/2014 | Lee | H04W 72/048 455/444 |
| 2014/0073337 A1* | 3/2014 | Hong | H04W 16/28 455/452.1 |
| 2014/0211756 A1* | 7/2014 | Bontu | H04W 36/026 370/331 |
| 2015/0031369 A1* | 1/2015 | Gunnarsson | H04W 36/04 455/438 |
| 2015/0173017 A1* | 6/2015 | Rakotoharison | H04W 52/0222 370/311 |
| 2015/0257073 A1* | 9/2015 | Park | H04B 7/0408 370/331 |
| 2015/0351135 A1* | 12/2015 | Schmidt | H04W 76/10 455/450 |
| 2016/0219475 A1* | 7/2016 | Kim | H05K 999/99 |
| 2016/0269087 A1* | 9/2016 | Subramanian | H04B 7/024 |
| 2017/0127320 A1* | 5/2017 | Mok | H04W 36/32 |
| 2018/0048413 A1* | 2/2018 | Liu | H04W 48/18 |
| 2018/0323848 A1* | 11/2018 | Mizusawa | H04W 16/28 |
| 2018/0359790 A1* | 12/2018 | Ingale | H04W 28/16 |
| 2019/0335475 A1* | 10/2019 | Liang | H04W 72/0413 |

FOREIGN PATENT DOCUMENTS

| | | | | |
|---|---|---|---|---|
| EP | 2 983 439 A1 | | 2/2016 | |
| EP | 2983439 A1 | * | 2/2016 | ........... H04W 24/10 |
| EP | 3573369 A1 | * | 11/2019 | ........... H04W 88/08 |
| WO | WO 2008/137376 A2 | | 11/2008 | |
| WO | WO 2011/020614 A1 | | 2/2011 | |
| WO | WO-2011020614 A1 | * | 2/2011 | ............. H04W 4/24 |
| WO | WO 2014/110410 A1 | | 7/2014 | |
| WO | WO-2014110410 A1 | * | 7/2014 | ........ H04W 72/1242 |
| WO | WO 2016/006958 A1 | | 1/2016 | |
| WO | WO 2016/204661 A1 | | 12/2016 | |

* cited by examiner

METHOD FOR ENABLING DIFFERENTIATED CHARGING SUPPORT

CROSS REFERENCE TO RELATED APPLICATIONS

This application is a 35 U.S.C. § 371 national stage application of PCT International Application No. PCT/SE2016/050450, filed on May 18, 2016, the disclosure and content of which is incorporated by reference herein in its entirety.

TECHNICAL FIELD

The present disclosure relates to methods, devices and computer programs for enabling differentiated charging support.

BACKGROUND

To cope with increasing mobile traffic demands and higher expectations for better user experience, macro cells are complemented with small cells and in particular indoor small cells or indoor systems like Radio Dot System, RDS, and Distributed Antenna Systems, DAS, since the majority of mobile traffic is generated in indoor locations. It is often mentioned that 70-80% of traffic demand comes from indoor areas. Enterprise services are moreover being proposed by operators, offering companies and its employees a solution with range of services and wireless access in their premises. Enterprise services can also be offered to visitors in visitor-centric areas such as shopping malls and stadiums. Residential areas, e.g. multi-family buildings, may also be targeted with indoor deployments and specific service offerings due to the increased focus on the problem with energy efficient building materials preventing coverage from outdoor base stations. Compared to traditional mobile broadband services, it is expected that enterprise and residential services would target much higher capacity (data demand per user) and user experience targets. For example, enterprise/residential users should get unlimited data when in the office/home. This is typically not the case for mobile broadband services where user data volumes are limited per month.

Wireless communications use both licensed and unlicensed spectrum. 3rd Generation Partnership Project, 3GPP, technologies typically use licensed spectrum where a single operator uses a part of the licensed spectrum in a country or other area. Unlicensed spectrum is available for e.g. WLAN and it can be used by several parties and operators in the same area. Sharing rules and techniques are employed in order to avoid uncoordinated interference between the users. Due to output power limitations and regulations, the unlicensed spectrum is in many cases useful only in indoor locations.

It is being discussed to use Long Term Evolution, LTE, in unlicensed bands, e.g. 5 GHz, so called Licensed Assisted Access, LAA, where unlicensed spectrum is used for data transmissions in combination with a licensed spectrum part used for control signaling.

Evolved Packet System, EPS, is the Evolved 3GPP Packet Switched Domain and consists of Evolved Packet Core, EPC, and Evolved Universal Terrestrial Radio Access Network, E-UTRAN.

Figure 1A:
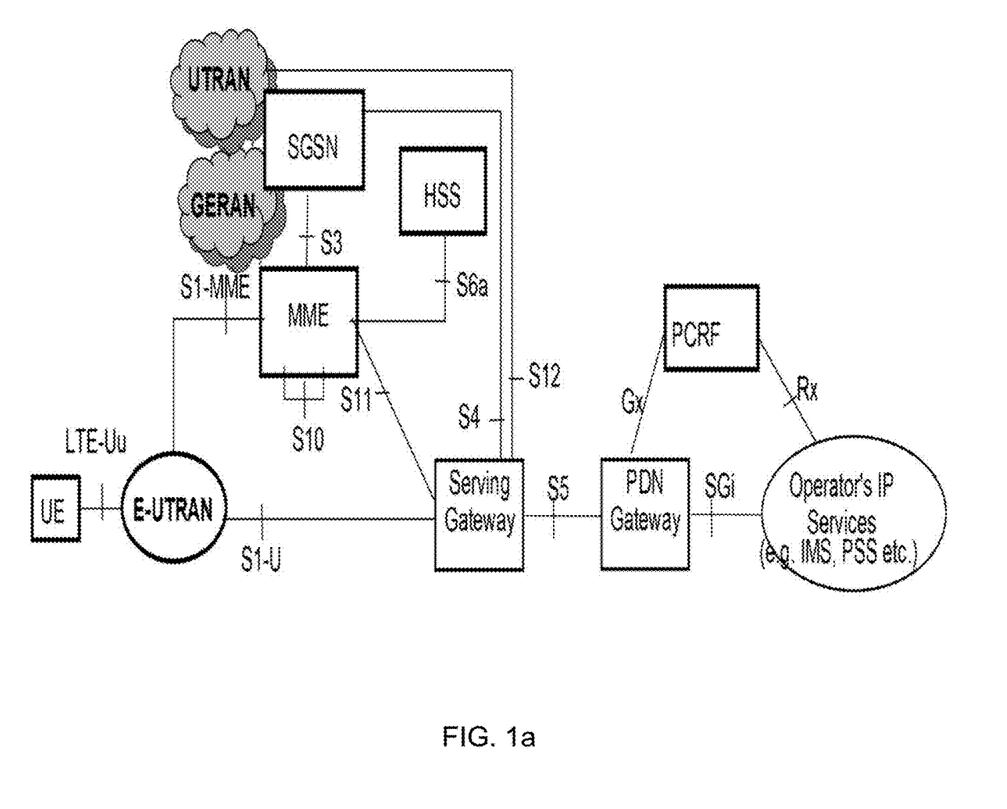
FIG. 1*a* schematically illustrates an overview of the EPC architecture.

FIG. 1a is an overview of the EPC architecture. This architecture is defined in 3GPP TS 23.401. See 3GPP TS 23.401 for a definition of the PDN Gateway, PGW, Serving Gateway, SGW or S-GW, Policy and Charging Rules Function, PCRF, Mobility Management Entity, MME and user equipment, UE. The LTE radio access, E-UTRAN, comprises of one more eNodeBs, eNBs.

Figure 1B:
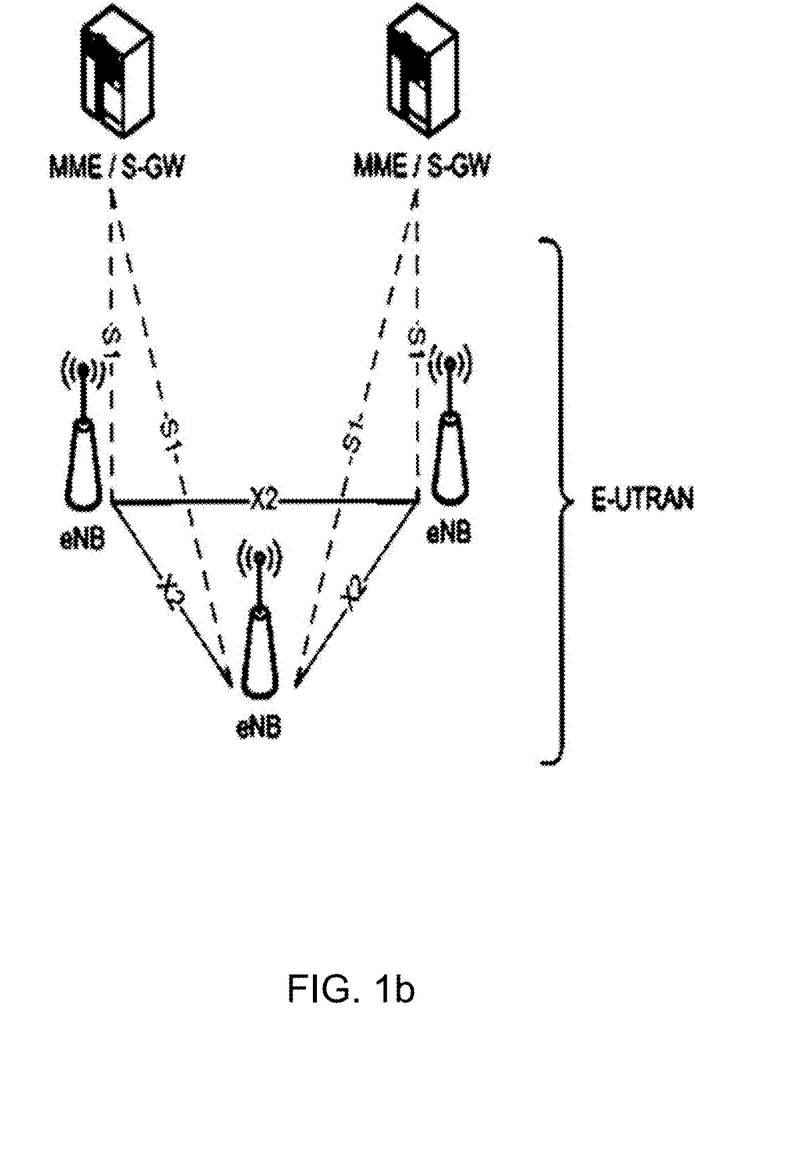
FIG. 1*b* schematically illustrates the overall E-UTRAN architecture.

FIG. 1b shows the overall E-UTRAN architecture and is further defined in for example 3GPP TS 36.300. The E-UTRAN comprises eNBs, providing the E-UTRA user plane Packet Data Convergence Protocol, PDCP, /Radio Link Control, RLC, /Media Access Control, MAC, /Physical layer, PHY, and control plane (Radio Resource Control, RRC, in addition to the above user plane protocols) protocol terminations towards the UE. The eNBs are interconnected with each other by means of the X2 interface. The eNBs are also connected by means of the S1 interface to the EPC, more specifically to the Mobility Management Entity, MME, by means of the S1-MME interface and to the Serving Gateway, S-GW, by means of the S1-U interface.

Figure 1C:
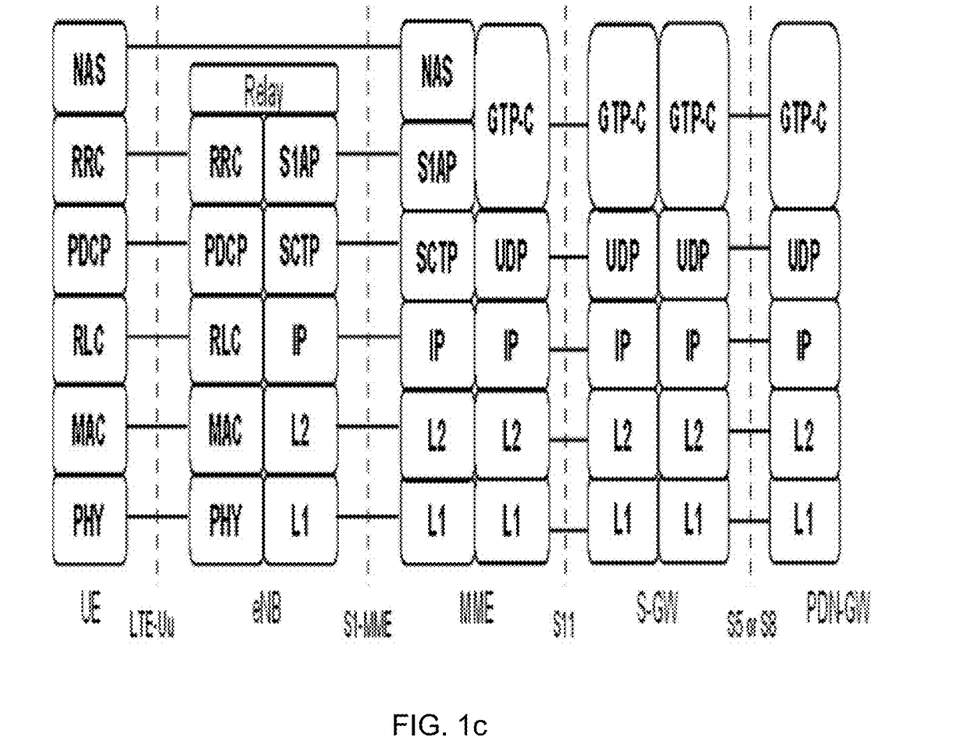
FIG. 1*c* schematically illustrates the main parts of the EPC Control Plane, CP.
Figure 1D:
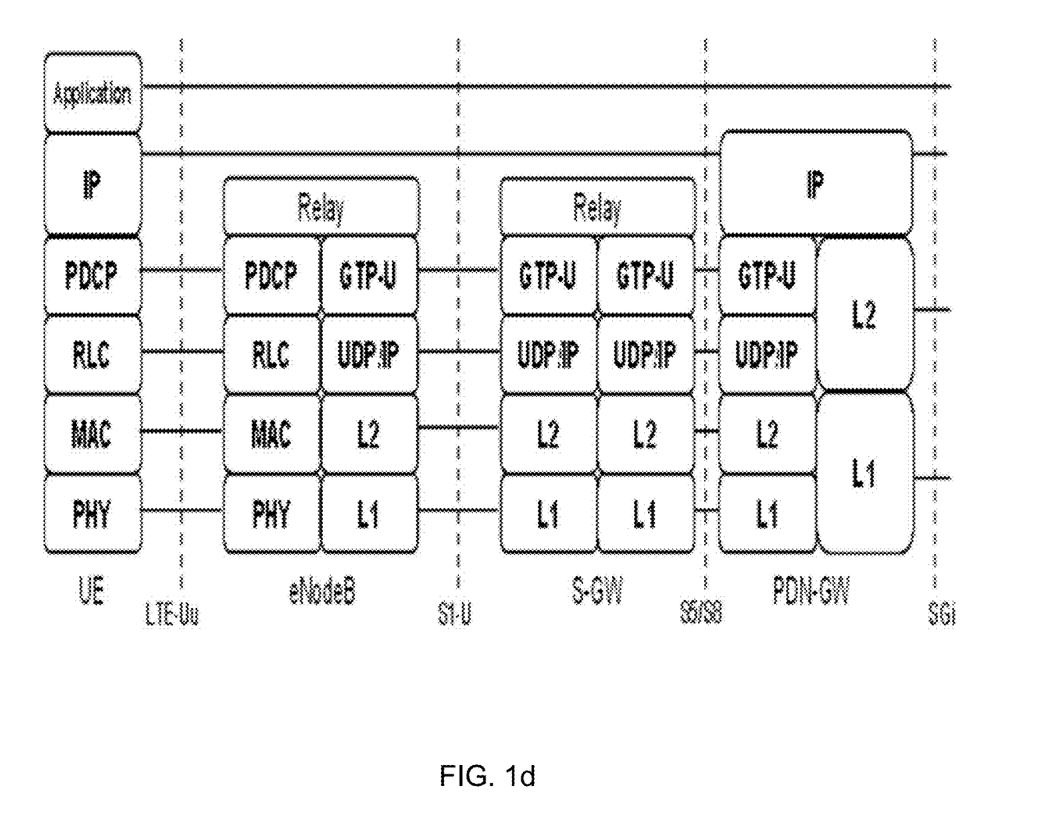
FIG. 1*d* schematically illustrates the main parts of the EPC User Plane, UP.

The main parts of the EPC Control Plane, CP and User Plane, UP architectures are shown in FIGS. 1c and 1d.

The eNB control and user plane protocols and related functionality can be deployed in different ways. In one example, all the protocol layers and related functionality is deployed in the same physical node including the antenna. One example of this is a so called Pico or Femto eNodeB, or more generally low power RBS. Another deployment example is a so called Main-Remote split. In this case the eNodeB is divided into Main Unit and Remote Unit that may also be called as Digital Unit, DU, and Remote Radio Unit, RRU, respectively. The Main Unit contains all the protocol layers, except the lower parts of the PHY layer that are instead placed in the Remote Radio Unit. The split in the PHY-layer is at the time domain (IQ) data level (after/before Inverse Fast Fourier Transform, IFFT, /FFT and Cyclic Prefix, CP, insertion/removal) that is forwarded from the Main Unit to the Remote Radio Unit over so called Common Public Radio Interface, CPRI-interface, (high speed, low latency data interface). The Remote Radio Unit then performs the needed Digital-to-Analog, DAC, conversion to create analogue Radio Frequency data, RF-data, power amplifies and forwards the analogue RF data to the antenna.

E-UTRAN Cell Global Identification, ECGI, is used in E-UTRAN/LTE to uniquely identify a cell. ECGI consists of PLMN Identifier, PLMN-Id, and the E-UTRAN Cell Identity, ECI. PLMN-Id consists of Mobile Country Code, MCC, and Mobile Network Code, MNC, and ECI is of fixed length of 28 bits. ECI may further be divided into eNB-Identifier and Cell Identifier parts, for example by using 20 bits for the eNB-identifier and 8 bits for the Cell Identifier.

Beamforming is a signal processing technique used for directional signal transmission or reception. Digital or analogue beam forming can be used for 5G mobile communications where communication signals are conveyed within one or several specific beams between a radio network node and a UE. A beam from a radio network node can have a beam identity.

There exist multiple different solutions to have macro network controlled solutions for indoor deployments. The main principle for these solutions is that a UE is "anchored" in a macro network base station. The macro network base station is connected to the indoor deployment and decides when the UE should be connected via the macro network and/or the indoor deployment. This is typically based on the UE providing measurement reports of an indoor system indicating that an indoor deployment is available for the UE to use. The main benefits with these kinds of solutions are improved mobility support when moving between macro networks and indoor deployments. When it comes to mobility the core network is normally unaware of whether the UE is connected to the macro network or the indoor deployment as the UE is from core network point of view connected to the macro network base station (as it is "anchored" there meaning for example that the S1-MME interface between the macro network base station and the core network is maintained in this kind of mobility). Another advantage is that the macro coverage can be utilized for the indoor deployment, reducing the cost and number of indoor nodes required to cover the area.

The macro network controlled solutions for indoor deployments can be based on for example LTE Carrier Aggregation, CA, LTE Licensed Assisted Access, LAA, LTE Dual Connectivity, DC and aggregation between LTE and different unlicensed spectrum based solutions such as WLAN.

The 3GPP Rel-10 specifications have been standardised, supporting Component Carrier, CC, bandwidths up to 20 MHz, which is the maximal LTE Rel-8 carrier bandwidth. An LTE Rel-10 operation wider than 20 MHz is possible and appear as a number of LTE CCs to an LTE Rel-10 terminal. The straightforward way to obtain bandwidths wider than 20 MHz is by means of Carrier Aggregation, CA. CA implies that an LTE Rel-10 terminal can receive multiple CC, where the CC have, or at least the possibility to have, the same structure as a Rel-8 carrier.

The Rel-10 standard supports up to 5 aggregated CCs where each CC is limited in the RF specifications to have a one of six bandwidths namely 6, 15, 25, 50, 75 or 100 RB, corresponding to 1.4, 3, 5, 10, 15 and 20 MHz respectively.

The number of aggregated CCs as well as the bandwidth of the individual CCs may be different for uplink and downlink. A symmetric configuration refers to the case where the number of CCs in downlink, DL, and uplink, UL, is the same whereas an asymmetric configuration refers to the case that the number of CCs is different in DL and UL. It is important to note that the number of CCs configured in the network may be different from the number of CCs seen by a terminal: A terminal may for example support more downlink CCs than uplink CCs, even though the network offers the same number of uplink and downlink CCs.

CCs are also referred to as cells or serving cells. More specifically, in an LTE network the cells aggregated by a terminal are denoted primary Serving Cell, PCell, and secondary Serving Cells, SCells. The term serving cell comprises both PCell and SCells. All UEs have one PCell and which cell is a UEs PCell is terminal specific and is considered "more important", i.e. vital control signaling and other important signaling is typically handled via the PCell. Uplink control signaling is always sent on a UEs PCell. The component carrier configured as the PCell is the primary CC whereas all other component carriers are secondary serving cells. The UE can send and receive data both on the PCell and SCells. For control signaling such as scheduling commands this could either be configured to only be transmitted and received on the PCell but where the commands are also valid for SCell, or it can be configured to be transmitted and received on both PCell and SCells. Regardless of the mode of operation, the UE will only need to read the broadcast channel in order to acquire system information parameters on the Primary Component Carrier, PCC. System information related to the Secondary Component Carriers, SCCs, may be provided to the UE in dedicated RRC messages.

During initial access a LTE Rel-10 terminal behaves similar to a LTE Rel-8 terminal. However, upon successful connection to the network a Rel-10 terminal may—depending on its own capabilities and the network capabilities—be configured with additional serving cells in the UL and DL. Configuration is based on RRC. Due to the heavy signaling and rather slow speed of RRC signaling it is envisioned that a terminal may be configured with multiple serving cells even though not all of them are currently used.

There are different deployment scenarios for CA in relation to frequency bands, and the placement of cells within frequency bands. The different variants are i) intra-band aggregation, contiguous cells, ii) intra-band aggregation, non-contiguous cells and iii) inter-band aggregation. The different frequency bands are typically part of licensed spectrum in CA.

To summarise, LTE CA supports efficient use of multiple carriers, allowing data to be sent/received over all carriers. There is support for cross-carrier scheduling avoiding the need that the UE listen to all carrier-scheduling channels all the time. The solution relies on tight time synchronisation between the carriers. The synchronisation requirements impact the different deployment possibilities. When it comes to the Main-Remote deployment, there are different possibilities on how CA can be deployed either within a DU or between different DUs. It is possible to both have Intra-DU CA meaning that the PCell and all the SCell(s) are controlled by the same DU. Inter-DU CA, on the other hand, means that the PCell and SCell(s) may be controlled by different DUs.

LTE Licensed Assisted Access, LTE LAA, is shortly about applying LTE CA also for unlicensed spectrum. The main driver is assumed high availability of unlicensed spectrum globally and especially used for small cells, i.e. cells of low power RBSs. Unlicensed spectrum is used as a performance booster managed by a licensed carrier in LTE LAA. The PCell is always in the licensed spectrum and the SCell may use unlicensed bands (in addition to or without SCell(s) on licensed bands). LTE LAA is a variant of inter-band aggregation. LTE LAA is also called LTE-Unlicensed, LTE-U, and both terms are used in this disclosure.

When deploying indoor solutions in enterprise or residential buildings, it can be difficult and costly to achieve indoor dominance, i.e. that the indoor system provides stronger signal than outdoor macro inside the building. Indoor dominance is required to connect indoor users to the indoor system when a small cell selection offset is used. In LTE, a cell selection offset of up to 9 dB is possible but in many cases the difference between macro and indoor signals can be much larger. The reason is that the macro uses much higher power e.g. 60-80 W than indoor small cells, <1 W. There can also be line-of-sight propagation from the macro towards the building or a low building penetration loss that increase this effect in some areas. The indoor small cells also use limited power to avoid radiation effects since users can be very close to the small cell antenna. The lack of indoor dominance, i.e. partial dominance, will cause the indoor users to be connected to the macro system in these areas. As a result, there may be an impact on the macro capacity since the enterprise/residential users are expected to demand a high amount of data due to unlimited data offerings (part of the enterprise/residential offerings).

To handle this, interworking between the macro and indoor system is needed. Dual connectivity and LTE/WLAN aggregation are other solutions that can be used to avoid the macro to be overloaded in these situations. In a special case, it may be possible to serve the affected indoor areas from the macro alone. The solution where macro and an indoor system jointly serve an indoor area is denoted macro controlled solutions.

One problem with previously known solutions is how to provide differentiated charging in specific service areas e.g.

"indoor areas". The basic challenge is to provide "zero-rated traffic" for e.g. office/residential users (mobile enterprise/residential cases) and visitors (shopping mall/stadium cases).

A previously known solution is to provide an indoor system with full indoor dominance so that indoor cells cover basically all indoor areas (99-100%). In this case, the solutions are straight-forward. The main principle is that each indoor cell provides a specific Cell Global Identity, CGI, and/or Closed Subscriber Group ID, CSG-ID, to the Core Network, CN, and then CN performs charging as normally. "Normally" here means that some level of configuration is needed in the charging systems. This configuration can be on different levels, and one simple example is associations like "UE IMSI"←→"Free CGIs or CSG-IDs" meaning that this specific UE will get "zero rated" traffic in the configured free CGIs and/or CSG-IDs. The drawback is that this solution is costly since many indoor cells are needed to overcome the macro dominance.

When partial indoor dominance is present, the "zero rating" area could be widened to also cover all surrounding macro cells covering the indoor area to be "zero-rated". This solution type is generous in the sense that the UEs will also receive "zero rating" in the macro cells surrounding the indoor area. These solutions may also need a huge (re) configuration effort when new network configurations are made. The operator will also loose revenue since enterprise users are not charged when served by the surrounding macros. In dense macro networks, the number of macros that may be heard in a building may be substantial. In an Asian network deployment example, up to 15 macro sectors were partly covering areas of an office building (at different floors).

There is therefore a need for an improved solution for providing differentiated charging, which solution solves or at least mitigates at least one of the above mentioned problems.

SUMMARY

An object of the present disclosure is to provide a method, device and computer program to provide a notification to a Core Network Node informing about a change of service area for a UE, the indication enabling a CN function to change the service charge for the UE.

The method, device and computer program seeks to mitigate, alleviate, or eliminate one or more of the above-identified deficiencies in the art and disadvantages singly or in any combination.

According to aspects, the disclosure presents a method, performed in a first Radio network node, serving a first service area, of notifying a Core Network node, CN, of a change of service area for a User Equipment, UE. The method comprises detecting that the UE has changed location between the first service area and a second service area served by at least a second Radio network node, wherein the first and second service areas are being associated with a respective service charge, and providing a notification to the Core Network Node informing about the change of service area for the UE, the indication enabling a CN function to change the service charge for the UE.

According to further aspects, the disclosure relates to a first Radio network node, serving a first service area, of notifying a Core Network node, CN, of a change of service area for a User Equipment, UE, comprising a processor and a memory. The memory containing instructions executable by the processor whereby the first Radio network node is operative to. Detect that the UE has changed location between the first service area and a second service area served by at least a second Radio network node, wherein the first and second service areas are being associated with a respective service charge, and provide a notification to the Core Network Node informing about the change of service area for the UE, the indication enabling a CN function to change the service charge for the UE.

An advantage with exemplary embodiments of the present disclosure is that differentiated charging can be provided for different service areas, for instance an indoor enterprise service area operating under partial dominance from macro radio network node in another service area. There is no need to zero-charge users in the neighbor service area, hence increasing revenue for operators.

Another advantage with exemplary embodiments of the present disclosure is that the solution also integrates e.g. an indoor service area to an e.g. macro service area and reduces the indoor service area deployment cost, compared to the solution for charging based on full indoor service area dominance.

BRIEF DESCRIPTION OF THE DRAWINGS

Further objects, features, and advantages of the present disclosure will appear from the following detailed description, wherein some aspects of the disclosure will be described in more detail with reference to the accompanying drawings, in which.

DETAILED DESCRIPTION

Aspects of the present disclosure will be described more fully hereinafter with reference to the accompanying drawings. The device, method and computer program disclosed herein can, however, be realized in many different forms and should not be construed as being limited to the aspects set forth herein. Like numbers in the drawings refer to like elements throughout.

The terminology used herein is for the purpose of describing particular aspects of the disclosure only, and is not intended to limit the disclosure. As used herein, the singular forms "a", "an" and "the" are intended to include the plural forms as well, unless the context clearly indicates otherwise.

Figure 2:
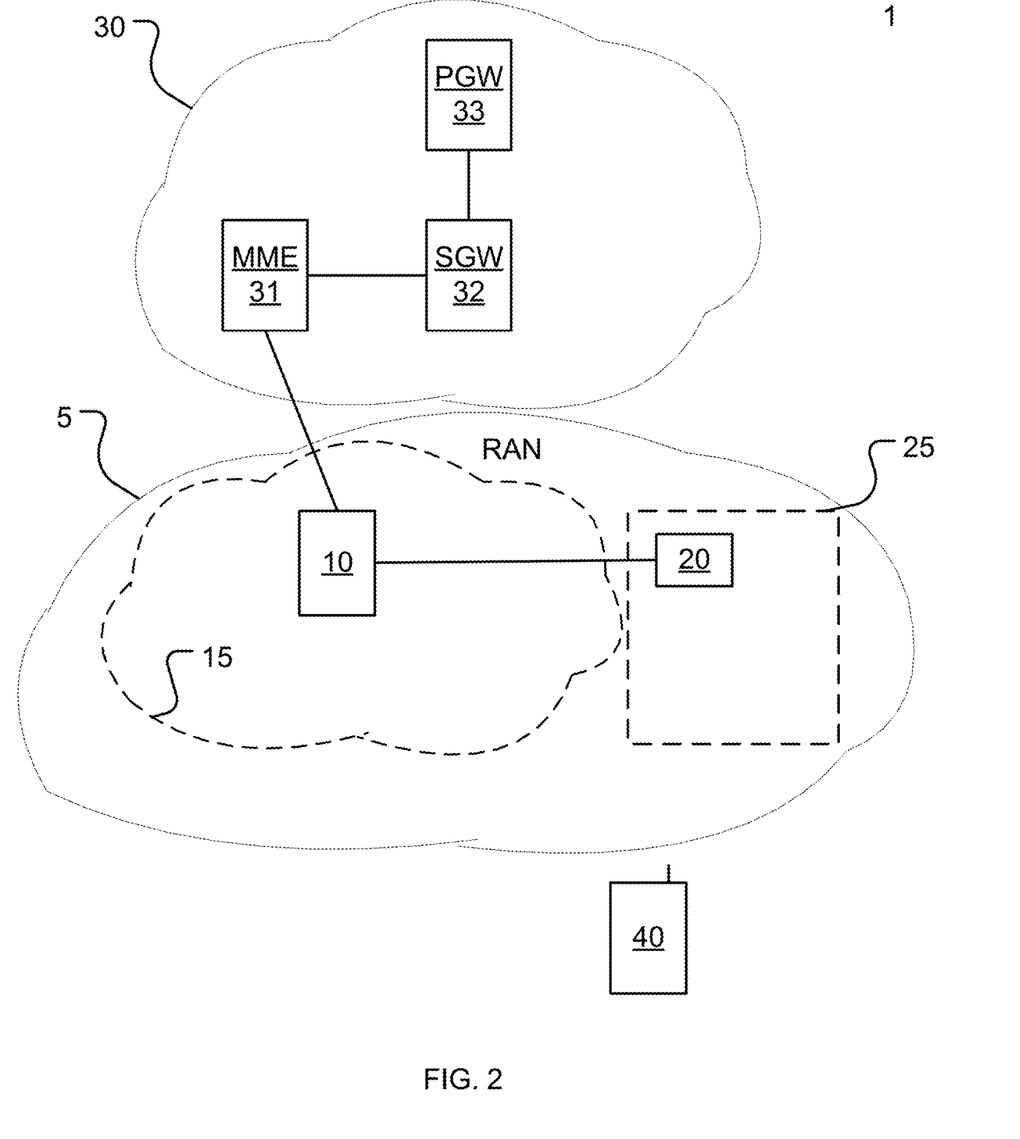
FIG. 2 schematically illustrates a cellular communication network in which exemplary embodiments of the present disclosure can be implemented.

FIG. 2 schematically illustrates an example of a cellular communication network 1 in which aspects of the present disclosure can be implemented. The cellular communication network 1 comprises a Radio Access Network, RAN 5. The RAN 5 comprises at least a first Radio network node 10 and a second Radio network node 20.

A first service area 15 is served by at least the first Radio network node 10. The first service area 15 can according to aspects of the present disclosure for instance be a wide outside area 15. A second service area 25 served by at least a second Radio network node 20. The second service area 25 can according to aspects of the present disclosure for instance be a shopping mall or an office building 25. In some scenarios the second service area may also be overlapping with the first service area meaning that the second service area is also served by the first Radio network node 10 (this is not shown in FIG. 2).

The first Radio network node 10 and the second Radio network node 20 are connected via X2 or another interface depending on the technical solution used for the integration of the second Radio network node 20 to the first Radio network node 10. The RAN 5 is connected to a Core Network, CN 30. According to aspects of the present disclosure the CN 30 comprises a MME 31 and a PGW 33. Further the CN 30 may comprise a SGW 32.

It is an object of the present disclosure to provide embodiments solving the problem of providing differentiated charging in different service areas. One object is to provide no service charge to users in e.g. a second service area. The second service area is e.g. a shopping mall or an office building.

Figure 3:
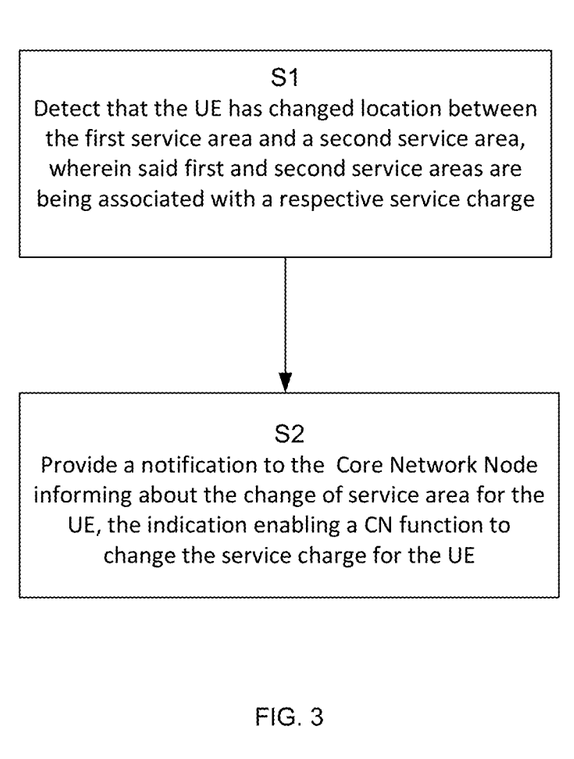
FIG. 3 is a flow chart illustrating an exemplary embodiment of the method performed in a first radio network node.

FIG. 3 illustrates the steps in a method, performed in a first Radio network node 10, serving a first service area 15, of notifying the Core Network Node 31, of a change of service area for the User Equipment, UE 40. In a first step S1 the first Radio network node 10 detects that the UE 40 has changed location between the first service area 15 and a second service area 25 served by at least the second Radio network node 20. The first and second service areas 15, 25 are being associated with a respective service charge. In a next step S2, the first Radio network node 10 provides a notification to the Core Network Node 31 informing about the change of service area for the UE 40, the indication enabling a CN function (not shown) to change the service charge for the UE 40.

According to one aspect of the present disclosure the UE 40 is connected via the second Radio network node 20 at least for the user plane parts. Control plane may be either via the second Radio network node 20 to the first Radio network node 10 or directly from the UE 40 to the first Radio network node 10. The UE 40 is therefore anchored in the first Radio network node 10 and for the CN 30 point of view the UE 40 is connected to the first Radio network node 10.

In an exemplary embodiment the first radio Network node 10 is a MeNB and the UE 40 is initially connected via the first radio Network node 10. Then the different CN nodes maintain an UE context for the UE 40 and the contents of these UE contexts depend on the role and function of the specific CN node. According to one aspect, as the UE 40 is connected via the first Radio network node 10, a service charge associated with the first service area 15 is applied for the UE 40.

According to aspects of the present disclosure the notification is an E-UTRAN Cell Global Identification, ECGI, informing the Core Network Node 31 about the change of service area for the UE 40 to another of the first and second service areas 15, 25 with the ECGI.

In an exemplary embodiment of the present disclosure the first and/or second radio Network nodes 10, 20 can be configured with at least one ECGI. These ECGIs are configured in the CN 30 to indicate that a service charge associated with the ECGI should be applied for the UE 40. For example, a Policy and Charging Rules Function, PCRF, an Online Charging System, OCS, an Offline Charging System, OFCS, and PDN-GW can according to aspects be configured with the relation between a service charge and the ECGI. In other exemplary embodiments, this information is stored in a HLR/HSS and provided to the MME 31 when the UE 40 attaches to cellular communication network 1. In still another exemplary embodiment, the ECGIs associated with the first or second service areas are configured in the CN 30 to indicate that a service charge associated with the first or second service area should be applied. When the UE 40 initially attaches to the cellular communication network 1 via the first radio Network node 10, or is handed over to the first radio Network node 10, one of the ECGIs of the first radio Network node 10 is signaled to the CN 30 for the UE 40.

In yet another exemplary embodiment, specific ECGIs associated with the first or second service area are configured in the CN 30 and once such notification is received for a UE 40, it may be used to trigger a specific service charge for the UE 40. This means that the CN 30 may also contain predefined associations between the UE 40 and specific ECGIs. This means that a notification of an ECGI to the CN 30 triggers a service charge only in the case when the UE 40 is pre-associated with this particular ECGI. This allows the possibility to achieve service area based service charge meaning that for example only members (e.g. employees) of the service area are handled with a specific service charge and that for example visitors will be given another service charge.

According to an aspect of the present disclosure an ECGI can be configured in the second Radio Network node 20 and signaled from the second Radio Network node 20 to the first Radio network node 10 for example when neighboring cell relations are created.

According to yet another aspect of the present disclosure, the UE 40 informs the first radio Network node 10 about an ECGI for the second radio Network node 20. According to another aspect of the present disclosure, the first radio Network node 10 is configured with a set of ECGIs and uses these towards the Core Network Node 31.

According to an aspect of the present disclosure, when the UE 40 leaves the second service area 25 served by at least the second Radio network node 20, the first Radio network node 10 can signal an ECGI associated with the first service area 15 to the Core Network Node 31 and a service charge associated with the first service area 25 can be again triggered for the UE 40.

In yet another aspect of the present disclosure the notification is a Closed Subscriber Group identity, CSG, informing the Core Network Node 31 about the change of service area for the UE 40 to another of the first and second service areas 15, 25 with the CSG-identity. Once it is detected that the UE 40 has changed location between the first service area 15 and the second service area 25 served by at least the second Radio network node 20, the CSG-ID is provided as a notification to the Core Network Node 31. This enables the CN function to change the service charge for the UE 40.

According to one aspect, a list of CSG-IDs can be configured for the UE 40 in the HSS. Once the first Radio network node 10 indicates a CSG-ID to the Core Network Node 31, the Core Network Node 31 can check if the UE 40 is a member of the CSG-ID indicated from the first Radio network node 10. If the UE 40 is a CSG-ID member then a service charge associated with the second service area 25 can be activated for the UE 40. If the UE 40 is not a CSG member then another service charge may be selected for the UE 40.

According to another aspect, the notification is a message informing the Core Network Node 31 that the UE 40 no longer is connected to a Closed Subscriber Group, CSG or a specific service area.

According to yet another aspect of the present disclosure the step of detecting further comprises detecting that the UE 40 has changed location based on measurement reports received from the UE 40. In one exemplary embodiment the measurement reports comprises cell identity information or frequency information belonging to the first and/or second Radio network nodes 10, 20 received from the UE 40.

In another exemplary embodiment of the present disclosure the measurement reports comprises signal strength values belonging to the first and/or second Radio network node 10, 20, received from the UE 40.

According to aspects of the present disclosure, the first radio Network node 10 may also apply specific logic to compare the received measured signal strength of the second radio Network node 20 with a received value indicating the signal strength of the current cell in the first radio Network node 10. Logic in the first radio Network node 10 may for example be based on using a specific margin between the received signal strengths.

According to yet another aspect of the present disclosure the notification is a Service Area Indicator, informing the Core Network Node 31 about the change of service area for the UE 40 to another of the first and second service areas 15, 25 with the Service Area Indicator. In this case the first Radio network node 10 and/or the second Radio network node 20 may be configured with specific Service Area Indicator for the first and the second service areas, and the notification to the Core Network Node 31 is the Service Area Indicator for the current service area for the UE 40.

According to another aspect of the present disclosure the first Radio network node 10 is a Master eNB, MeNB and the second Radio network node 20 is a Secondary, SeNB, or a WLAN Termination, WT node/function, or a eNB supporting SCells on licensed or unlicensed spectrum.

In one exemplary embodiment of the present disclosure the Core Network Node 31 is a MME. In this exemplary embodiment the first Radio network node 10 provides the notification to the MME informing about the change of service area for the UE 40. The MME forwards the received notification to the SGW 32 and the SGW 32 forwards it further to the PGW 33. The PGW 33 may inform the PCRF, the OCS and/or the OFCS about the notification about the change of service area for the UE 40.

According to another aspect of the present disclosure the notification is sent from the first Radio network node 10 to the MME 31 over an S1-MME interface as an S1AP message.

The S1AP HANDOVER NOTIFY message is currently used to indicate that the UE 40 has successfully performed an S1-based handover. According to one aspect of the present disclosure this S1AP HANDOVER NOTIFY message is used to provide a notification to the MME 31 about an ECGI, a CSG-ID for the second service area 25, an ECGI for the first service area 15, a Service Area Indicator for either the first service area 15 or the second service area 25, or a notification that the UE 40 no longer is connected to a CSG.

The S1AP PATH SWITCH REQUEST is currently used to inform the MME 31 that the UE 40 has performed an X2-based handover and is used to move the S1AP association for the UE 40 to the target first or second Radio network node 10, 20 and to move the GTP-U terminations (i.e. ERABs) to the target first or second Radio network node 10, 20. According to one aspect of the present disclosure this S1AP PATH SWITCH REQUEST message is used to provide a notification to the MME 31 about an ECGI, a CSG-ID for the second service area 25, an ECGI for the first service area 15, a Service Area Indicator for either the first service area or the second service area, or a notification that the UE 40 no longer is connected to a CSG. There is normally no need to move the S1AP association or update any of the GTP-U terminations in this case.

The S1AP UPLINK NAS TRANSPORT message is currently used to forward a NAS PDU from the UE 40 to the MME 31. According to one aspect of the present disclosure, this S1AP UPLINK NAS TRANSPORT message is used to inform the MME 31 about an ECGI, a CSG-ID for the second service area 25, an ECGI for the first service area 15, a Service Area Indicator for either the first service area or the second service area, or a notification that the UE 40 no longer is connected to a CSG.

The S1AP LOCATION REPORT message is currently used by the first Radio network node 10 to provide the UE's 40 location to the MME 31. In the current standard the MME 31 subscribes to this message by sending a S1AP LOCATION REPORTING CONTROL message to the first Radio network node 10.

According to one aspect of the present disclosure, this S1AP LOCATION REPORT message is used to inform the MME 31 about an ECGI, a CSG-ID for the second service area 20, an ECGI for the first service area 15, a Service Area Indicator for either the first service area or the second service area, or a notification that the UE 40 no longer is connected to a CSG.

The S1AP E-RAB MODIFICATION INDICATION is currently used by the first Radio network node 10 to trigger the SCG bearer option for Dual Connectivity. It informs the MME 31 and SGW 32 that some bearers of the UE 40 should be moved to the second Radio network node 20. According to one aspect of the present disclosure, this S1AP E-RAB MODIFICATION INDICATION message is used to inform the MME 31 about an ECGI, a CSG-ID for the second service area 25, an ECGI for the first service area 15, a Service Area Indicator for either the first service area or the second service area, or a notification that the UE 40 no longer is connected to a CSG. There is normally no need to move any bearers as these are likely to remain anchored in the first Radio network node 10.

According to another aspect of the present disclosure any other existing S1AP message sent from the first Radio network node 10 to the MME 31 can be used to inform the MME 31 about an ECGI, a CSG-ID for the second service area 25, an ECGI for the first service area 15, a Service Area Indicator for either the first service area or the second service area, or a notification that the UE 40 no longer is connected to a CSG.

According to yet another aspect of the present disclosure a new S1AP message sent from the first Radio network node 10 to the MME 31 can be used to inform the MME 31 about an ECGI, a CSG-ID for the second service area 25, an ECGI for the first service area 15, a Service Area Indicator for either the first service area or the second service area, or a notification that the UE 40 no longer is connected to a CSG.

According to another aspect of the present disclosure in the step of detecting, the detection is based on the first Radio network node 10 learning that the second Radio network node 20 is associated with the second service area 25 at least partly based on communication between the first Radio network node 10 and the second Radio network node 20. This aspect can be used by the first Radio network node 10 to detect that the UE 40 has changed location between the first service area 15 and the second service area 25 served by at least the second Radio network node 20. Thus the first Radio network node 10 is able to differentiate the cases when for example Carrier Aggregation, CA, or LTE Dual Connectivity, DC, is activated between different cells serving a same service area and when no notification need to be sent to the core network node. Compared to the case when CA or DC is used between the first Radio network node 10 and the second Radio network node 20 and when the notification should be sent to the core network node 31.

According to an aspect of the present disclosure the communication between the first Radio network node 10 and the second Radio network node 20 consists of cell type information or beam identity for cells or beams served by the second Radio network node 20. According to another aspect of the present disclosure the communication between the first Radio network node 10 and the second Radio network node 20 consists of a Radio network node type indication.

According to an aspect of the present disclosure the communication between the first Radio network node 10 and the second Radio network node 20 comprises a Service Area Indicator, SAI, associated with cells or beams for the second Radio network node 20.

According to yet another aspect of the present disclosure the method further comprises a step of changing connection for the UE 40 to the first and second Radio Network node 10, 20 based on the detection. This means that the first Radio network node 10 may activate any of the described macro network controlled solutions for indoor deployments.

Figure 4:
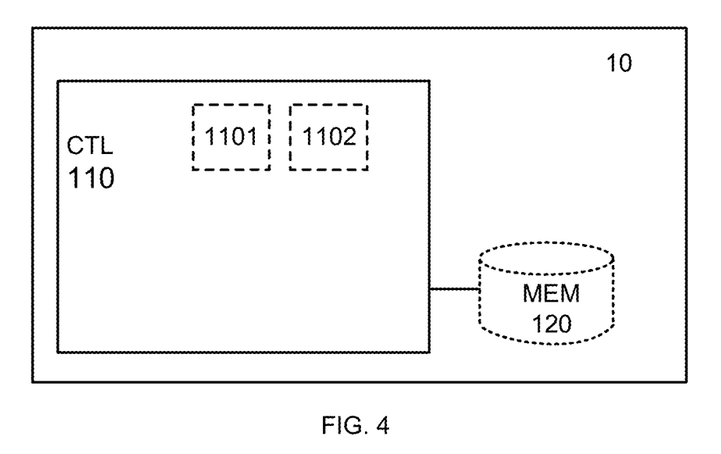
FIG. 4 is a schematic diagram illustrating a radio network node according to an exemplary embodiment of the present disclosure.

Turning now to FIG. 4, a schematic diagram is disclosed illustrating an exemplary embodiment of the first Radio network node 10, serving a first service area 15. The first Radio network node 10 comprises a processor 110 and a memory 120, the memory 120 containing instructions executable by the processor 110. The processor 110 is a Central Processing Unit, CPU, microcontroller, Digital Signal Processor, DSP, or any other suitable type of processor capable of executing computer program code. The memory 120 is a Random Access Memory, RAM, a Read Only Memory, ROM, or a persistent storage, e.g. a single or combination of magnetic memory, optical memory, or solid state memory or even remotely mounted memory.

According to one aspect, the disclosure further relates to the above mentioned computer program, comprising computer readable code which, when run on the first Radio network node 10 causes the first Radio network node 10 to perform any of the aspects of the method described above.

When the above-mentioned computer program code is run in the processor 110 of the first Radio network node 10 it causes the first Radio network node 10 to detect that the UE 40 has changed location between the first service area 15 and the second service area 25 served by at least the second Radio network node 20, wherein said first and second service areas 15, 25 are being associated with a respective service charge. The computer program codes further causes the first Radio network node 10 to providing a notification to the Core Network Node 31 informing about the change of service area for the UE 40, the indication enabling a CN function to change the service charge for the UE 40.

According to one aspect of the disclosure the processor 110 comprises one or several of:
  a detecting module 1101 adapted to detect that the UE 40 has changed location between the first service area 15 and a second service area 25 served by at least a second Radio network node 20, wherein said first and second service areas are being associated with a respective service charge; and
  a providing module 1102 adapted to provide a notification to the Core Network Node 31 informing about the change of service area for the UE 40, the indication enabling a CN function to change the service charge for the UE 40.

According to a further aspect the first Radio network node 10 is further adapted to detect that the UE 40 has changed location based on measurement reports received from the UE 40. According to one aspect the first Radio network node 10 comprises a detecting module 1101 configured for this purpose.

According to a further aspect the first Radio network node 10 is further adapted to detect that the UE 40 has changed location based on measurement reports received from the UE 40, wherein the measurement reports comprises cell identity information or frequency information belonging to the first and/or second Radio network node 10, 20. According to one aspect the first Radio network node 10 comprises a detecting module 1101 configured for this purpose.

According to a further aspect the first Radio network node 10 is further adapted to detect that the UE 40 has changed location based on measurement reports received from the UE 40, wherein the measurement reports comprises signal strength values belonging to the first and/or second Radio network node 10, 20, received from the UE 40. According to one aspect the first Radio network node 10 comprises a detecting module 1101 configured for this purpose.

According to a further aspect the first Radio network node 10 is a Master eNB, MeNB and the second Radio network node 20 is a Secondary, SeNB, or a WLAN Termination, WT, node/function, or a eNB supporting SCells on licensed or unlicensed spectrum.

According to a further aspect the Core Network Node 31 is a Mobility Management Entity, MME 31.

According to a further aspect the first Radio network node 10 is further adapted to send the notification from the first Radio network node 10 to the MME 31 over an S1-MME interface as an S1AP message. According to one aspect the first Radio network node 10 comprises a providing module 1102 configured for this purpose.

According to a further aspect the first Radio network node 10 is further adapted so that the notification is an E-UTRAN Cell Global Identification, ECGI, informing the Core Network Node 31 about the change of service area for the UE 40 to another of the first and second service areas 15, 25 with the ECGI. According to one aspect the first Radio network node 10 comprises a providing module 1102 configured for this purpose.

According to a further aspect the first Radio network node 10 is further adapted so that the notification is a Closed Subscriber Group identity, CSG, informing the Core Network Node 31 about the change of service area for the UE 40 to another of the first and second service areas 15, 25 with the CSG-identity. According to one aspect the first Radio network node 10 comprises a providing module 1102 configured for this purpose.

According to a further aspect the first Radio network node 10 is further adapted so that the notification is a Service Area Indicator, informing the Core Network Node 31 about the change of service area for the UE 40 to another of the first and second service areas with the Service Area Indicator. According to one aspect the first Radio network node 10 comprises a providing module 1102 configured for this purpose.

According to a further aspect the first Radio network node 10 is further adapted so that the notification is a message informing the Core Network Node 31 that the UE 40 no longer is connected to a Closed Subscriber Group, CSG or a specific service area. According to one aspect the first Radio network node 10 comprises a providing module 1102 configured for this purpose.

According to a further aspect the first Radio network node 10 is further adapted to detect based on the first Radio network node 10 learning that the second Radio network node 20 is associated with the second service area 25 at least partly based on communication between the first Radio network node 10 and the second Radio network node 20. According to one aspect the first Radio network node 10 comprises a detecting module 1101 configured for this purpose.

According to a further aspect the first Radio network node 10 is further adapted to detect based on the first Radio network node 10 learning that the second Radio network node 20 is associated with the second service area 25 at least partly based on that the communication between the first Radio network node 10 and the second Radio network node 20 consisting of cell type information or beam identity for cells served by the second Radio network node 20. According to one aspect the first Radio network node 10 comprises a detecting module 1101 configured for this purpose.

According to a further aspect the communication between the first Radio network node 10 and the second Radio network node 20 consisting of a Service Area Indicator, SAI, associated with cells or beams for the second Radio network node 20. According to one aspect the first Radio network node 10 comprises a detecting module 1101 configured for this purpose.

According to a further aspect the first Radio network node 10 is further adapted to change connection for the UE 40 to the first and second Radio Network node 10, 20 based on the detection.

The detecting module 1101 and a providing module 1102 are implemented in hardware or in software or in a combination thereof. The modules 1101, 1102 are according to one aspect implemented as a computer program stored in the memory 120 which run on the processing circuitry 110. The first Radio network node 10 is further configured to implement all the aspects of the disclosure as described in relation to the methods above.

Although aspects of the disclosure are described in a "LTE/4G" context, it is understood that the disclosure also applies to any other communications system, such as "5G".

Aspects of the disclosure are described with reference to the drawings, e.g., block diagrams and/or flowcharts. It is understood that several entities in the drawings, e.g., blocks of the block diagrams, and also combinations of entities in the drawings, can be implemented by computer program instructions, which instructions can be stored in a computer-readable memory, and also loaded onto a computer or other programmable data processing apparatus. Such computer program instructions can be provided to a processor of a general purpose computer, a special purpose computer and/or other programmable data processing apparatus to produce a machine, such that the instructions, which execute via the processor of the computer and/or other programmable data processing apparatus, create means for implementing the functions/acts specified in the block diagrams and/or flowchart block or blocks.

In some implementations and according to some aspects of the disclosure, the functions or steps noted in the blocks can occur out of the order noted in the operational illustrations. For example, two blocks shown in succession can in fact be executed substantially concurrently or the blocks can sometimes be executed in the reverse order, depending upon the functionality/acts involved. Also, the functions or steps noted in the blocks can according to some aspects of the disclosure be executed continuously in a loop.

In the drawings and specification, there have been disclosed exemplary aspects of the disclosure. However, many variations and modifications can be made to these aspects without substantially departing from the principles of the present disclosure. Thus, the disclosure should be regarded as illustrative rather than restrictive, and not as being limited to the particular aspects discussed above. Accordingly, although specific terms are employed, they are used in a generic and descriptive sense only and not for purposes of limitation.

The invention claimed is:

1. A method, performed in a first Radio network node, serving a first service area, of notifying a Core Network node, CN, of a change of service area for a User Equipment, UE, the method comprising:
   determining that a second Radio network node serves a second service area comprising an indoor service area that is also served by the first Radio network node based on communication between the first Radio network node and the second Radio network node that is installed within the indoor service area, wherein the determination is performed based on beam identity information for cells or beams served by the second Radio network node that is contained in said communication between the first Radio network node and the second Radio network node;
   detecting that said UE has entered the second service area served by the second Radio network node based on the communication between the first Radio network node and the second Radio network node, wherein said first service area is associated with a first service charge and said second service area is associated with a second service charge; and
   providing a notification to said Core Network Node that the UE has entered the second service area, said notification enabling the CN Network Node to change a service charge for said UE from the first service charge to the second service charge.

2. The method according to claim 1, wherein the step of detecting further comprises detecting that the UE has entered the second service area further based on measurement reports received from the UE.

3. The method according to claim 2, wherein the measurement reports comprises cell identity information, frequency information or beam identity belonging to the second Radio network node, received from the UE.

4. The method according to claim 2, wherein the measurement reports comprises signal strength values belonging to the second Radio network node, received from the UE.

5. The method according to claim 1, wherein the first Radio network node is a Master eNB, MeNB and the second Radio network node is a Secondary, SeNB, or a WLAN Termination (WT) node/function, or an eNB supporting SCells on licensed or unlicensed spectrum.

6. The method according to claim 1, wherein said Core Network Node is a Mobility Management Entity, MME.

7. The method according to claim 6, wherein said notification is sent from the first Radio network node to a MME over an S1-MME interface as an S1AP message.

8. The method according to claim 1, wherein said notification comprises an E-UTRAN Cell Global Identification (ECGI) associated with the second service area.

9. The method according to claim 1, wherein said notification comprises a Closed Subscriber Group identity (CSG) associated with the second service area.

10. The method according to claim 1, wherein said notification comprises a Service Area Indicator (SAI) associated with the second service area.

11. The method according to claim 1, wherein said notification is a message indicating that said UE no longer is connected to a Closed Subscriber Group (CSG).

12. The method according to claim 1, wherein said communication further comprises a Service Area Indicator, SAI, associated with the cells or beams for the second Radio network node.

13. The method according to claim 1, wherein the method further comprises a step of:
changing connection for the UE from said first Radio Network node to said second Radio Network node based on the detection.

14. A first Radio network node, serving a first service area, of notifying a Core Network node, CN, of a change of service area for a User Equipment, UE, comprising a processor and a memory, said memory containing instructions executable by said processor that when executed by said processor causes said processor to operate to:
determine that a second Radio network node serves a second service area comprising an indoor service area that is also served by the first Radio network node based on communication between the first Radio network node and the second Radio network node that is installed within the indoor service area, wherein the determination is performed based on beam identity information for cells or beams served by the second Radio network node that is contained in said communication between the first Radio network node and the second Radio network node;
detect that said UE has entered the second service area served by the second Radio network node based on the communication between the first Radio network node and the second Radio network node, wherein said first service area is associated with a first service charge and said second service area is associated with a second service charge; and
provide a notification to said Core Network Node that the UE has entered the second service area, said notification enabling the CN Network Node to change a service charge for said UE from the first service charge to the second service charge.

15. The first Radio network node according to claim 14, wherein the first Radio network node is further operative to detect that the UE has entered the second service area based on measurement reports received from the UE.

16. The first Radio network node according to claim 15, wherein the measurement reports comprises cell identity information, frequency information or beam identity belonging to the second Radio network node, received from the UE.

17. The first Radio network node according to claim 15, wherein the measurement reports comprises signal strength values belonging to the second Radio network node, received from the UE.

18. The first Radio network node according to claim 14, wherein the first Radio network node is a Master eNB, MeNB and the second Radio network node is a Secondary, SeNB, or a WLAN Termination (WT) node/function, or a eNB supporting SCells on licensed or unlicensed spectrum.

19. The first Radio network node according to claim 14, wherein said Core Network Node is a Mobility Management Entity, MME.

20. The first Radio network node according to claim 19, wherein said notification is sent from the first Radio network node to the MME over an S1-MME interface as an S1AP message.

21. The first Radio network node according to claim 14, wherein said notification comprises an E-UTRAN Cell Global Identification (ECGI) associated with the second service area.

22. The first Radio network node according to claim 14, wherein said notification comprises a Closed Subscriber Group identity (CSG) associated with the second service area.

23. The first Radio network node according to claim 14, wherein said notification comprises a Service Area Indicator (SAI) associated with the second service area.

24. The first Radio network node according to claim 14, wherein said notification is a message indicating that said UE no longer is connected to a Closed Subscriber Group (CSG).

25. The first Radio network node according to claim 14, wherein said communication further comprises a Service Area Indicator, SAI, associated with the cells or beams for the second Radio network node.

26. The first Radio network node according to claim 14, wherein the memory comprises further instructions executable by the processor that causes the processor to further operate to:
change a connection for the UE from said first Radio Network node to said second Radio Network node based on the detection.

27. A computer-readable storage medium comprising a non-transitory computer readable medium storing program code that when executed by a processor of a first Radio network node that serves a first area, causes the processor to perform operations comprising:
determining that a second Radio network node serves a second service area comprising an indoor service area that is also served by the first Radio network node based on communication between the first Radio network node and the second Radio network node that is installed within the indoor service area, wherein the determination is performed based on beam identity information for cells or beams served by the second Radio network node that is contained in said communication between the first Radio network node and the second Radio network node;
detecting that said UE has entered the second service area served by the second Radio network node based on the communication between the first Radio network node and the second Radio network node, wherein said first service area is associated with a first service charge and said second service area is associated with a second service charge; and
providing a notification to said Core Network Node that the UE has entered the second service area, said notification enabling the CN Network Node to change a service charge for said UE from the first service charge to the second service charge.

28. The method according to claim 7, wherein the S1AP message comprises one of a S1AP HANDOVER NOTIFY message, a S1AP PATH SWITCH REQUEST message, a S1AP UPLINK NAS TRANSPORT message, a S1AP LOCATION REPORT message, and a S1AP E-RAB MODIFICATION INDICATION message.

* * * * *